United States Patent
Hahn

(10) Patent No.: US 6,217,929 B1
(45) Date of Patent: *Apr. 17, 2001

(54) SPOONABLE, LOW WATER ACTIVITY BATTERS

(75) Inventor: Patricia W. Hahn, Plymouth, MN (US)

(73) Assignee: The Pillsbury Company, Minneapolis, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,785

(22) Filed: Jun. 4, 1998

Related U.S. Application Data

(60) Provisional application No. 60/053,527, filed on Jul. 23, 1997.

(51) Int. Cl.$^7$ .................................................. A21D 10/04
(52) U.S. Cl. ........................... 426/549; 426/552; 426/658
(58) Field of Search .................................... 426/549, 552, 426/653, 439, 658

(56) References Cited

U.S. PATENT DOCUMENTS

| | | | |
|---|---|---|---|
| 2,197,820 | 4/1940 | Voss | 99/92 |
| 2,478,618 | 8/1949 | Armstrong et al. | 195/172 |
| 2,810,650 | 10/1957 | Joslin | 99/90 |
| 2,982,662 | 5/1961 | Cochran et al. | 99/192 |
| 3,021,220 | 2/1962 | Going et al. | 99/92 |
| 3,222,189 | 12/1965 | Perrozzi | 99/172 |
| 3,297,449 | 1/1967 | Baker et al. | 99/90 |
| 3,620,763 | 11/1971 | Hans | 99/92 |
| 3,649,304 | 3/1972 | Fehr, Jr. et al. | 99/192 |
| 3,655,404 | 4/1972 | Glasser et al. | 99/92 |
| 3,767,421 | 10/1973 | Gulstad et al. | 99/92 |
| 3,769,034 | 10/1973 | Dreier, Jr. et al. | 426/151 |
| 3,784,710 | 1/1974 | Earle et al. | 426/128 |
| 3,970,763 | 7/1976 | Moran et al. | 426/324 |
| 4,154,863 | 5/1979 | Kahn et al. | 426/553 |
| 4,353,932 | 10/1982 | Bone | 476/532 |
| 4,372,982 | 2/1983 | Haasl et al. | 426/549 |
| 4,436,758 | 3/1984 | Thompson | 426/549 |
| 4,624,856 | * 11/1986 | Vanderveer et al. | 426/549 |
| 4,650,686 | * 3/1987 | Young et al. | 426/653 X |
| 4,668,519 | * 5/1987 | Dartey et al. | 426/658 X |
| 4,803,084 | 2/1989 | Shine | 426/20 |
| 4,839,178 | 6/1989 | Seneau | 426/19 |
| 4,847,104 | 7/1989 | Benjamin et al. | 426/549 |
| 4,904,493 | 2/1990 | Petrizzelli | 426/549 |
| 5,080,919 | * 1/1992 | Finley et al. | 426/549 X |
| 5,171,599 | 12/1992 | Weber | 426/549 |
| 5,178,893 | 1/1993 | Seewi et al. | 426/549 |
| 5,352,473 | 10/1994 | Chiqurupati et al. | 426/549 |
| 5,366,744 | 11/1994 | Drummond et al. | 426/128 |
| 5,409,720 | 4/1995 | Kent et al. | 426/128 |
| 5,492,710 | * 2/1996 | Seyan | 426/549 X |
| 5,571,544 | 11/1996 | Domingues | 426/62 |

FOREIGN PATENT DOCUMENTS 951955   7/1974   (CA).

OTHER PUBLICATIONS

Dorko, C. L. et al., "Particle Size of Encapsulated Sodium Bicarbonates: Effect on Refrigerated Batter and Muffins Baked in Conventional an Microwave Ovens", *Journal of Food Science*, vol. 58, No. 3, pp. 579–582 (1993).

Dorko, C. L. et al., "Melt Point of Encapsulated Sodium Bicarbonates: Effect on Refrigerated Batter and Muffins Baked in Conventional and Microwave Ovens", *Journal of Food Science*, vol. 58, No. 3, pp. 574–578 (1993).

"Wheat Chemistry and Technology", *American Association of Cereal Chemists*, Inc., 3 pgs. (1978).

* cited by examiner

Primary Examiner—Milton Cano

(74) *Attorney, Agent, or Firm*—Merchant & Gould P.C.

(57) ABSTRACT

A flour based batter composition is spoonable at refrigeration temperature and has a refrigerated shelf life of at least about 75 days. The batter has an intermediate water activity ($A_w$) of about 0.81 to 0.92. The batters can be baked into products such as muffins, pancakes, waffles, brownies, and other foods that have a high, fluffy texture and a baked height to raw height ratio of greater than about 1.

22 Claims, 4 Drawing Sheets

SPOONABLE, LOW WATER ACTIVITY BATTERS

This application claims the benefit of U.S. Provisional Application No. 60/053,527, filed Jul. 23, 1997.

FIELD OF THE INVENTION

This invention relates to flour based batter compositions that are spoonable and stable at refrigeration temperatures. The invention further relates to baked goods made from such batters.

BACKGROUND OF THE INVENTION

Muffins and related foods such as pancakes, cakes, brownies and the like are typically made from scratch or from a dry mix, where consumers make a batter by adding liquids to dry ingredients and then bake the batter soon after mixing. While these methods produce high quality baked goods, preparation of the batters can be time consuming and the batter should be used by the consumer immediately both to provide for optimum leavening action and because the batters are not microbiologically stable under refrigerated storage conditions. Some of these problems have been overcome by preparing muffins from frozen muffin batters wherein the consumer thaws and then bakes the batter. These batters have a slightly lower $A_w$ (water activity) than batters mixed from scratch or dry mixes, and can be stored for about 48 hours under refrigerated conditions while maintaining leavening and microbial stability properties. However, the lower water activity can result in a drier muffin than muffins prepared from a dry mix, and the refrigerated storage life of the thawed batter is short. If the entire batch is not used relatively quickly, there is the risk that the unused portion of the batter will spoil and be wasted.

There are some premixed refrigerated doughs available on the market, such as bread dough, cookie dough and the like. These doughs typically need to be hermetically sealed and/or stored under pressure in order to have good shelf stability properties in the refrigerator, which means that after opening they cannot be stored for long periods of time. These products also tend to have relatively low $A_w$ values, meaning that the resulting baked goods tend to be somewhat dry.

Attempts have been made to provide batters that can be stored in the refrigerator for long periods of time prior to baking. Joslin, U.S. Pat. No. 2,810,650 describes batters that contain a heat activated leavening system comprising dicalcium phosphate dihydrate. These batters showed good leavening properties after 45 days refrigerated storage in hermetically sealed cans. Cochran, U.S. Pat. No. 2,982,662 describes batters that can be stored for up to 17 days in sealed cans and then baked into satisfactory products.

Kahn et al., U.S. Pat. No. 4,154,863, describe intermediate moisture foods including doughs that are pourable or spoonable at freezer temperatures. These doughs can be stored at freezer temperatures and then baked.

In U.S. Pat. No. 4,353,932, Bone describes intermediate moisture pancake batters that are microbiologically stable and pourable at room temperatures. These batters have a water content of about 30 to 40% and a sugar content of about 14 to 20%.

There is a need for a batter that can be stored by the consumer in the refrigerator, that is spoonable and resembles a batter prepared from scratch or a dry mix, that can be stored for a long period of time in the refrigerator without the need for hermetic or pressurized sealing, and that produces a baked product comparable to those obtained when the batter is made from scratch or a dry mix.

SUMMARY OF THE INVENTION

The invention provides a batter comprising flour, water, sugar, shortening or oil, and a leavening system, wherein the batter is shelf stable for at least about 75 days when stored under refrigerated conditions. These batters are stable and spoonable at refrigeration temperatures (i.e., about 35–45° F., or about 1–7° C.), providing the consumer with the ability to prepare as few or as many portions as desired, then placing the remainder of the batter back into the refrigerator without risk of spoilage. The batters provide high quality baked products that are similar to those prepared either from scratch or a dry mix.

The term "batter" is intended to include any flour-based batter or dough. In general, batters are understood to be less viscous than doughs and to have more free water present. Some of the compositions of the invention may technically be considered a dough. However, depending upon the exact kinds and proportions of the ingredients used, the compositions of the invention could take the form of either a traditional batter or a dough, and both are encompassed by the invention. Surprisingly, whether the composition is technically a batter or a dough, the baked good resulting from the composition is similar to a product made from a traditional batter having higher amounts of free water.

All percentages are weight percentages based on the total weight of the composition unless otherwise indicated.

DETAILED DESCRIPTION OF THE INVENTION

Figure 1:
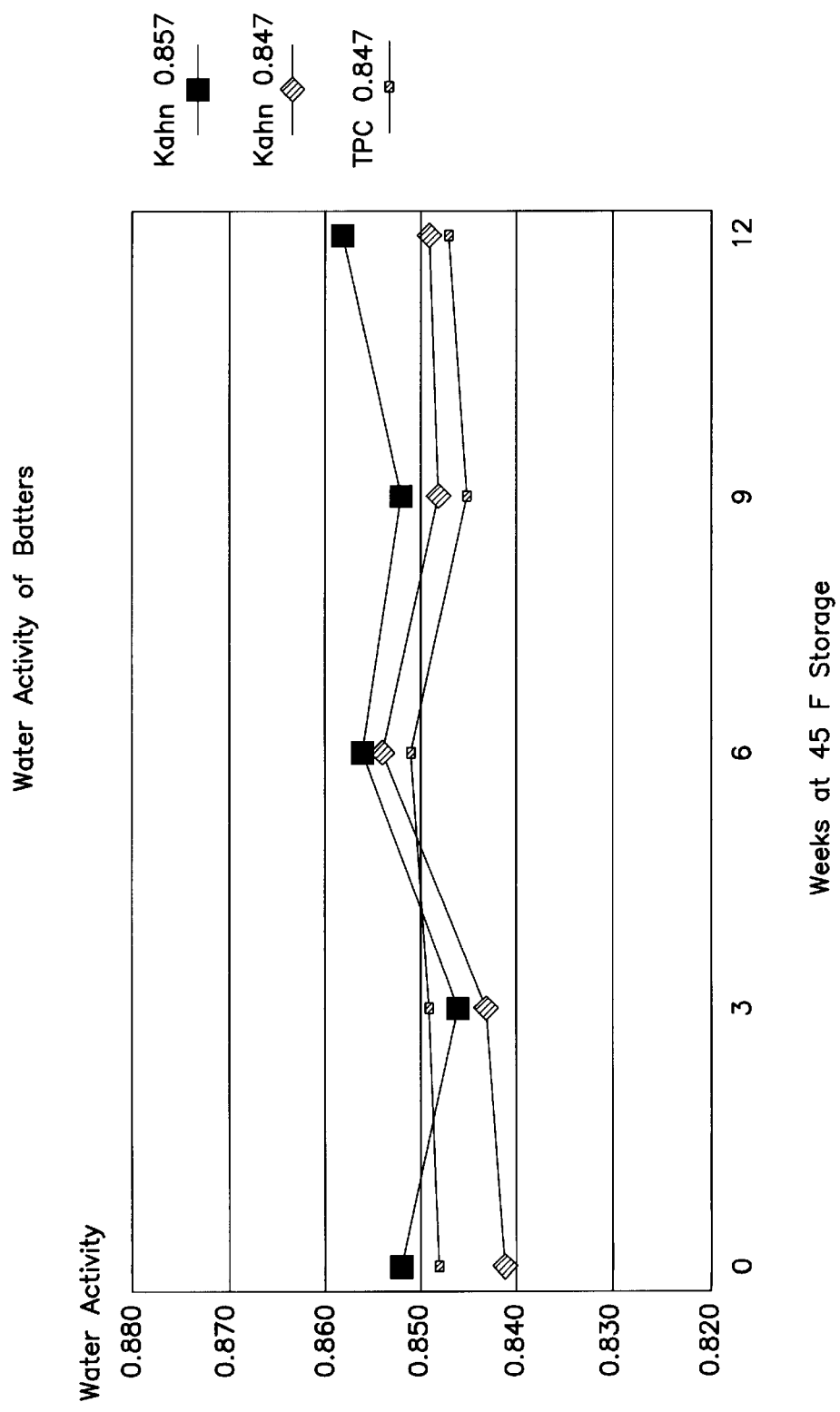
FIG. 1 is a graphical comparison of water activity values between two formulations of Kahn, U.S. Pat. No. 4,154,863, and the formulation of the invention.

The compositions of the invention are batters that contain flour, water, sugar, shortening or oil and a leavening system. These compositions are shelf stable for at least about 75 days under refrigerated conditions, are spoonable under refrigerated conditions, and when baked after refrigerated storage produce high quality baked foods.

The batter of the invention contains a flour component that contributes to the structure of the batter. A variety of different flours may be used, and different flours can be selected to give a variety of textures, tastes and appearances to the final baked product. Useful flours include hard wheat flour, soft wheat flour, corn flour, high amylose flour and low amylose flour. The relative proportions of the types of flours used can be varied as desired. The batters of the invention generally contain about 20 to 50 wt-% flour, preferably about 20 to 30 wt-%, and most preferably about 25.6 wt-%.

Sugars are present in the batter composition to provide sweetness and lower the $A_w$ of the batter. Water activity, $A_w$, is a measure of the water vapor pressure generated by the product and can be calculated by dividing the moles of water plus the moles of soluble solids into the moles of water. Lowering the water activity provides the microbial stability required to impart shelf stability under refrigerated conditions for extended periods of time. In general, the batters of the invention have a water activity of about 0.81 to about 0.92. If the water activity is higher, then microbial stability over extended time periods is reduced unless the water in the batter is frozen. If the water activity is lower, then the microbial stability under refrigeration temperatures is satisfactory, but the amount of available water is so low that the resulting baked product may not have a high volume and fluffy texture and may be unacceptably dry. The batter preferably has an $A_w$ of about 0.82 to 0.88, more preferably about 0.85.

The sugars useful in the present invention include saccharides that can reduce the amount of free water in the composition and thereby lower the $A_w$ of the composition. Useful sugars include monosaccharides, disaccharides, polysaccharides and their various degradation products. Examples of such sugars include the pentoses, xylose, arabinose, glucose, galactose, mannose, fructose, sorbose, lactose, maltose, dextrose, sucrose, maltodextrins, high fructose corn syrup (HFCS), molasses and brown sugar. Of these, the preferred sugars are sucrose, high fructose corn syrup, and maltodextrin. The batter contains about 20 to 40 wt-% total sugars, which refers to the total amount of saccharides and can be a mixture of two or more kinds of sugars. Preferably the batter contains about 20 to 30% total sugars. If desired, a polyhydric alcohol such as glycerol (glycerine) can be present as an additional water binding agent. If used, the polyhydric alcohol is present in an amount of up to about 5 wt-%. In a preferred embodiment of the invention, at least about 50%, for example about 50 to 95%, of the total sugar in the batter is sucrose. More preferably, at least about 70%, for example about 73 to 90%, of the total sugar in the batter is sucrose.

Because the sugars impart sweetness to the baked product, the kind and amount of sugar(s) is (are) selected to achieve a balance between reducing the $A_w$ of the composition a sufficient amount to provide microbial stability and obtaining the desired degree and quality of sweetness in the baked product. This can be achieved by balancing both the ratios of various sugars to one another and the ratios of sugars to water in the batter. While it is not strictly necessary to operate within these ratios, the following have been found to represent preferred ratios of some of these ingredients:

| Ratio | Preferred |
| --- | --- |
| HFCS/sucrose | 0.14–0.48 |
| HFCS/water | 0.28–0.60 |
| Sucrose/water | 1.26–2.00 |
| Total sugars/water | 1.00–2.20 |

Water is present in the batter compositions of the invention. The batters of the invention generally contain about 10 to 30 wt-% water, preferably about 15 to 25 wt-% water.

A shortening or oil is also present in the batter compositions of the invention. The shortening or oil can have beneficial effects on the volume, grain and texture of the final product, as well as the texture, mouthfeel and other organoleptic properties of the baked good. Animal or vegetable based natural shortenings can be used, as can synthetic shortenings or oils. Shortening is generally comprised of triglycerides, fats and fatty oils that are made predominantly from triesters of glycerol with fatty acids. Fats and fatty oils that may be found in the shortening include cottonseed oil, nut oil, soybean oil, sunflower oil, rapeseed oil, sesame oil, olive oil, corn oil, safflower oil, palm oil, palm kernel oil, coconut oil, and combinations thereof. These oils can also be used alone or in combination as the shortening or oil component of the batters of the invention. Butter is also a useful fat, and can provide flavor to the batters and finished baked food product. The batters of the invention generally contain about 5 to 20 wt-% shortening or oil, preferably about 10 to 15 wt-%.

The acid and base components of the chemical leavening system of the inventive batters are sequestered to prevent them from reacting with one another during storage so that the final baked good has the desired characteristics upon baking. The sequestration can be chemical or physical, and either or both of the leavening components, i.e. the acid and/or the base, can be sequestered. For example, the leavening system can include a heat activated leavening acid such as sodium aluminum phosphate, which does not interact with the leavening base (e.g., as sodium bicarbonate) until a particular temperature is reached. Alternatively, the leavening agent can include encapsulated sodium bicarbonate, which is physically prevented from reacting with the leavening acid until certain conditions are reached. The baking soda is then released from the encapsulate and leavening takes place.

Baking soda is a leavening base that is the primary source of carbon dioxide gas in many chemical leavening systems. This compound is stable and relatively inexpensive to produce. Baking soda can be used in either an encapsulated form or in a non-encapsulated form. Use of an encapsulated baking soda delays the onset of the leavening reaction as the encapsulating material must first be dissolved before the leavening reaction can occur.

Leavening acids include sodium or calcium salts of ortho, pyro, and complex phosphoric acids in which at least two active hydrogen ions are attached to the molecule. Baking acids include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-delta-lactone (GDL), potassium hydrogen tartrate (cream of tartar) and the like. The preferred leavening system includes sodium aluminum phosphate and baking soda. A sufficient amount of leavening is included to provide the finished baked product with the desired properties. Typically, the leavening system makes up about 0.4 to 1.0 wt-% of the batter and the ratio of leavening acid to leavening base is about 1:1 to 1.5:1.

Emulsifiers are nonionic, anionic, and/or cationic surfactants that influence the texture and homogeneity of the dough mixture, increase dough stability and improve eating quality. Emulsifiers include sodium stearoyl lactylate, sorbitan monostearate, polysorbate 60, polysorbate 80, lecithin, mono- and diglycerides of fatty acids, propylene glycol mono- and diesters of fatty acids, glyceryl-lacto esters of fatty acids, ethoxylated mono- and diglycerides, and the like. Such emulsifying agents are generally present in an amount of about 0.1 to 5.0 wt-%, preferably about 1.0 to 1.5 wt-%.

Gums or hydrocolloids can be added to the dough formulation to increase moisture content and improve the rheology and crumb texture by stabilizing small air cells within the batter and binding to moisture. Gums that can be used in the batters of the invention include xanthan gum, guar gum, locust bean gum, and the like. Gums are typically present in an amount of about 0.1 to 2.0 wt-%.

An antimycotic agent can be incorporated in to the batter to enhance microbial stability. Useful agents include sorbic acid and its derivatives such as sodium or potassium sorbate, propionic acid and its derivatives, vinegar, sodium diacetate, monocalcium phosphate, lactic acid, citric acid and so on. These agents are present in an amount effective to inhibit the growth of undesirable yeasts and/or molds, typically about 0.1 to 0.2 wt-%. Too little will not provide sufficient antimycotic effect, while too much can impart an off taste to the batter.

The microbial stability of the batter is further enhanced by maintaining the pH of the composition at a relatively low level such as about 6.0 to 7.0, preferably about 6.0 to 6.5. At this level not only is microbial stability enhanced but the performance of certain preservatives such as potassium sorbate can be enhanced as well.

In addition to the foregoing, other ingredients known to those of skill in the art can be included in the compositions to give a variety of desired properties, flavors and/or textures. Examples of these ingredients include flavoring and coloring agents, egg solids, milk solids, preservatives, gluten, starches, flavors, spices, flavor identifying particulates such as fruit, chocolate, or nuts, and the like.

The batters are prepared by combining the ingredients with stirring in a standard mixer such as a Sigma mixer. Preferably the mixing is carried out under refrigerated conditions, about 35–45° F. (1–7° C.). The order of addition of ingredients is not critical. For example, the leavening acid and base can be added together as dry ingredients, they can be added sequentially as dry ingredients, or the base (e.g. baking soda) can be added to the batter as a slurry. After mixing is complete, the batter is pumped and metered into a filler, and the batter is placed in suitable containers. The containers can be of any desired type, such as a tub with a snap-on lid made of a material such as polypropylene, linear low-density polypropylene, or other suitable material. The containers need not be hermetically sealed or pressurized to provide the batter with good microbial stability under refrigeration temperatures. A shrink band may be included to provide evidence of tampering.

The batters are spoonable under normal refrigeration conditions, generally about 35–45° F. (1–7° C.). By "spoonable", it is meant that the consumer can readily spoon or scoop the batter from the container. This quality can be described in terms of the yield stress of the composition. Yield stress is the amount of force required to cause the batter to deform or flow. Traditional batters, such as those made from scratch, have relatively low yield stress values, typically less than 100 Pascals (Pa) and more typically around 50 Pa or less. This is due to the continuous aqueous phase and high free water content of batters prepared in this manner. Traditional doughs, such as cookie doughs, tend to have low amounts of free water in the dough, and therefore have yield stress values that are quite high, around 6500 Pa. The batter of the invention has a yield stress value that is between that of a traditional batter and traditional dough. In general, the batters of the invention have a yield stress of about 100 to 1500 Pa, preferably about 200 to 1100 Pa, more preferably around 200 to 500 Pa.

The batter of the invention can be removed from the refrigerator and baked into high quality baked foods such as muffins, pancakes, brownies, waffles and other products. The batter is simply spooned from the container into a baking pan or onto a griddle or waffle iron and cooked under normal conditions, e.g. in a 350°–375° F. (176–191° C.) oven for a sufficient amount of time to fully cook the product. The batter bakes into a baked food that is high and fluffy, and preferably has a baked height-to-raw height ratio greater than about 1.0. The spoonability and outstanding stability of the batter gives the consumer portion control not previously available for batters, because the consumer can simply spoon out as much or as little of the batter as is desired and store the remaining portion in the refrigerator for later use. The batter will retain its leavening properties and microbial stability for at least about 75 days under refrigerated conditions. If desired, the batter may be frozen for even longer-term storage stability.

Along with the many other applications of the invention, it can be used as a chemically leavened quick bread, such as banana bread. The batter may be prepackaged in a suitable baking pan. The consumer may simply place the pan containing the batter in the oven to prepare the quick bread product.

The invention is further described by the following examples, which are understood to be illustrative and not limiting of the invention in any way.

EXAMPLES

The following examples are illustrative nonlimiting embodiments of the invention. At certain points, these embodiments of the invention are compared to examples of the prior art to further illustrate the invention.

Example 1

The following are sample formulations of batters of the invention prepared by cooling the ingredients to about 40° F. and mixing them in a mixer. In Table 1, all percentages are weight percentages based on the total weight of the batter; in Table 2 the percentages are weight percentages based on the total weight of the premix.

TABLE 1

| | Example 1 | Example 2 | Example 2' | Example 3 | Example 3' | Example 4 | Example 5 | Example 6 | Example 7 | Example 7' |
|---|---|---|---|---|---|---|---|---|---|---|
| | | | | | Sugar | | | | | |
| | Sucrose wt % | Sucrose & HFCS wt % | Sucrose & HFCS wt % | Sucrose & Glycerol wt % | Sucrose & Glycerol wt % | Sucrose & Glycerol & HFCS wt % | Sucrose & Maltose wt % | Sucrose & Maltodextrin & HFCS wt % | Sucrose & Sorbitol wt % | Sucrose & Sorbitol wt % |
| Premix | 5.26 | 5.26 | 5.26 | 5.26 | 5.26 | 5.26 | 5.26 | 5.26 | 5.26 | 5.26 |
| Sucrose | 28.51 | 20.44 | 24.47 | 20.44 | 24.48 | 20.44 | 20.44 | 10.22 | 20.44 | 26.49 |

TABLE 1-continued

| | Example 1 | Example 2 | Example 2' | Example 3 | Example 3' | Example 4 | Example 5 | Example 6 | Example 7 | Example 7' |
|---|---|---|---|---|---|---|---|---|---|---|
| | | | | | Sugar | | | | | |
| | Sucrose wt % | Sucrose & HFCS wt % | Sucrose & HFCS wt % | Sucrose & Glycerol wt % | Sucrose & Glycerol wt % | Sucrose & Glycerol & HFCS wt % | Sucrose & Maltose wt % | Sucrose & Maltodextrin & HFCS wt % | Sucrose & Sorbitol wt % | Sucrose & Sorbitol wt % |
| Flour | 25.58 | 25.58 | 25.58 | 25.58 | 25.58 | 25.58 | 25.58 | 25.58 | 25.58 | 25.58 |
| Egg Solids | 3.23 | 3.23 | 3.23 | 3.23 | 3.23 | 3.23 | 3.23 | 3.23 | 3.23 | 3.23 |
| K Sorbate | 0.16 | 0.16 | 0.16 | 0.16 | 0.16 | 0.16 | 0.16 | 0.16 | 0.16 | 0.16 |
| Water | 17.90 | 16.25 | 17.08 | 20.97 | 19.50 | 16.25 | 17.25 | 16.25 | 16.25 | 17.50 |
| Oil | 12.16 | 12.16 | 12.16 | 12.16 | 12.16 | 12.16 | 12.16 | 12.16 | 12.16 | 12.16 |
| HFCS | | 9.72 | 4.86 | | | 7.29 | | 9.72 | | |
| Glycerine | | | | 5.00 | 2.43 | 2.43 | | | | |
| Maltose Corn Syrup | | | | | | | 8.72 | | | |
| Maltodextrin 24 DE | | | | | | | | 10.22 | | |
| Sorbitol | | | | | | | | | 9.72 | 2.43 |
| Flavor | 0.20 | 0.20 | 0.20 | 0.20 | 0.20 | 0.20 | 0.20 | 0.20 | 0.20 | 0.20 |
| Fruit Bits (blueberry) | 7.00 | 7.00 | 7.00 | 7.00 | 7.00 | 7.00 | 7.00 | 7.00 | 7.00 | 7.00 |
| | 100.00 | 100.00 | 100.00 | 100.00 | 100.00 | 100.00 | 100.00 | 100.00 | 100.00 | 100.01 |
| $A_w$ | 0.838 | 0.837 | 0.838 | 0.852 | 0.847 | 0.835 | 0.85 | 0.857 | 0.845 | 0.845 |
| Total Sugar % | 28.5 | 27.9 | 27.9 | 25.4 | 26.9 | 28.1 | 28.6 | 18.5 | 27.3 | 28.2 |
| Total Sugar/Water Ratio | 1.59 | 1.71 | 1.63 | 1.21 | 1.38 | 1.73 | 1.66 | 1.13 | 1.67 | 1.61 |

TABLE 2

Premix

| Ingredient | % |
|---|---|
| Oil | 2.6 |
| Starch | 26.5 |
| Milk Solids | 17.5 |
| Emulsifiers | 22.0 |
| Gluten | 8.7 |
| Salt | 7.0 |
| Leavening Acid | 4.8 |
| Baking Soda | 4.4 |
| Flavor | 2.3 |
| Gums | 1.8 |
| Calcium Acetate | 1.4 |
| Citric Acid | 1.0 |

Working Example 2

Kahn et al., U.S. Pat. No. 4,154,863 teaches a formula for a low-water activity batter. However, the Kahn batters are meant to be stored frozen. A study was undertaken to determine whether the Kahn batter could be made storage stable under refrigerated conditions for 75 days.

The objective of the experiment was to compare performance of Kahn batter against the batter of the invention when stored under refrigerated conditions for 12 weeks. Product quality parameters include microbiological stability, bake height and specific volume of the baked product, batter appearance, and baked appearance.

The batter formula provided in Example 7 of Kahn U.S. Pat. No. 4,154,863 (Kahn A) was duplicated; preservatives (potassium sorbate and citric acid) were added to insure microbiological stability. Kahn A had an $A_w$ of 0.857. Another batter was prepared according to Kahn Example 7, (Kahn B), to which preservatives were added and the water activity lowered to 0.847 using ingredients already present in Example 7. These batters were compared to the batter of the invention at an $A_w$ of 0.847. No color was added to any of the formulas.

The formulas are presented in the following table:

TABLE 3

| | Formula | | | |
|---|---|---|---|---|
| Ingredients | Kahn A $A_w$ 0.857 % | Kahn B $A_w$ 0.847 % | Ingredients | Invention $A_w$ 0.847 % |
| Water | 15.00 | 13.00 | Water | 17.47 |
| Egg White-88% water | 8.75 | 8.75 | Egg Solids | 3.47 |
| Sugar Powdered | 8.75 | 8.75 | Sugar | 21.97 |
| Dextrose | 18.75 | 19.86 | | |
| Fructose Dextrose Syrup | 15.00 | 15.89 | High Fructose Corn Syrup | 10.45 |
| Emulsifier (Vanall) | 1.40 | 1.40 | Emulsifiers | 1.24 |
| Baking Powder | 1.30 | 1.30 | Baking Powder | 0.52 |
| Vegetable Oil | 2.50 | 2.50 | Soybean Oil | 13.22 |
| Vanilla | 0.20 | 0.20 | Flavor | 0.33 |
| Salt | 0.72 | 0.72 | Salt | 0.40 |
| Nonfat Dry Milk | 2.50 | 2.50 | Milk Solids | 0.99 |
| Cake Flour | 24.87 | 24.87 | Flour | 27.49 |
| Potassium Sorbate | 0.16 | 0.16 | Potassium Sorbate | 0.17 |
| Citric Acid | 0.10 | 0.10 | Citric Acid | 0.11 |
| | | | Starch | 1.50 |
| | | | Gluten | 0.49 |
| | | | Gums | 0.10 |
| | | | Calcium Acetate | 0.08 |

The oil and emulsifiers were heated together, and then all dry ingredients were added and mixed for 3 min. Water was added and mixed for 1 min. Egg, oil, and HFCS were added with 30 sec of mixing after each addition. The final batter was mixed another 30 sec. Then, the batters were stored in 18 oz polypropylene tubs with snap-on lids at 45° F. (about 7° C.) for 0, 3, 6, 9, and 12 weeks.

Every three weeks, batters were removed from storage for testing. Each batter was measured for $A_w$, using standard procedures with a Decagon instrument. Then, the batters were baked in a cupcake/muffin tin, with 60 g of batter per cupcake/muffin. Paper muffin liners were used for all bakes. Batters were baked at 375° F. (about 191° C.), for 20–28 min. Bake heights were measured with a ruler. Specific volume of the baked products were measured using a rapeseed volume displacement method. At week 0 and week 12, batters were evaluated for osmophilic yeast and molds.

All batters maintained their water activity throughout 12 weeks of storage at 45° F. (about 7° C.), as demonstrated by the graph given as FIG. 1.

All batters had low and acceptable levels of yeast and molds throughout the 12 weeks of storage at 45° F. (about 7° C.), as shown in the table below:

TABLE 4

| Osmophilic Yeast & Molds | Kahn A | Kahn B | Invention |
|---|---|---|---|
| $A_w$ | 0.857 | 0.847 | 0.847 |
| 0 weeks at 45° F. | <10 yeast | <10 yeast | <10 yeast |
|  | 20 est mold | 30 est mold | 20 est mold |
| 12 weeks at 45° F. | 10 est yeast | 10 est yeast | <10 yeast |
|  | 30 est mold | 30 est mold | 30 est mold |

Bake heights were low for both Kahn A and B products when compared to the product baked using the batter of the invention. All batters decreased in bake height with storage time at 45° F. The Kahn A and B batters started to drop in height after 3 weeks of storage.

Figure 2:
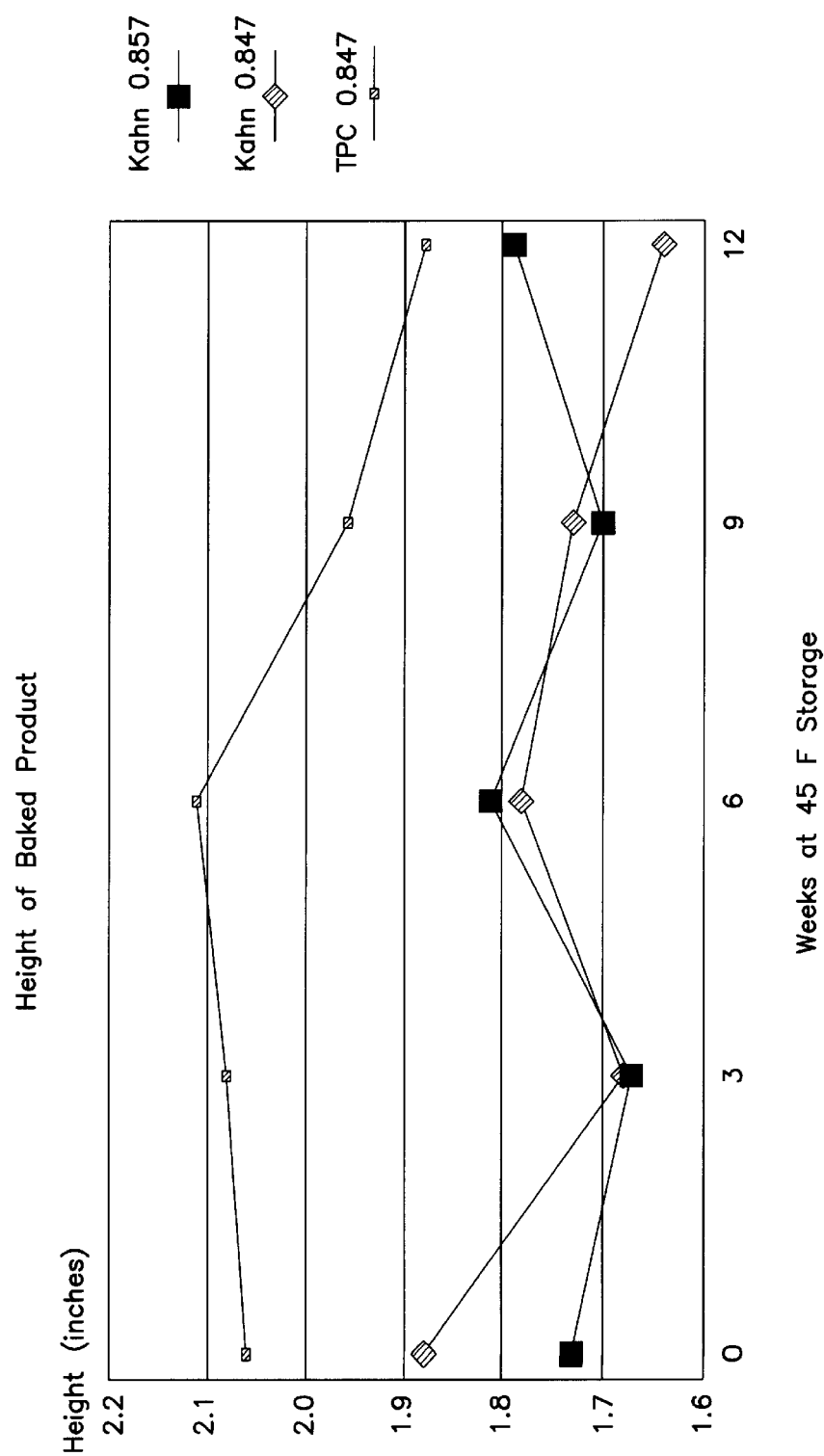
FIG. 2 is graphical comparison of the heights of baked products between two formulations of Kahn, U.S. Pat. No. 4,154,863, and the formulation of the invention.

The product of the present invention maintained its height until 9 weeks of storage, after which bake heights dropped. The product resulting from the batter of the invention maintained its bake height longer into refrigerated storage time than the Kahn A and B batters, as demonstrated in the graph given as FIG. 2.

The specific volume of the products resulting from the Kahn A and B batters dropped 25–28% over the storage period, with the drop happening within the first 3 weeks of storage.

Figure 3:
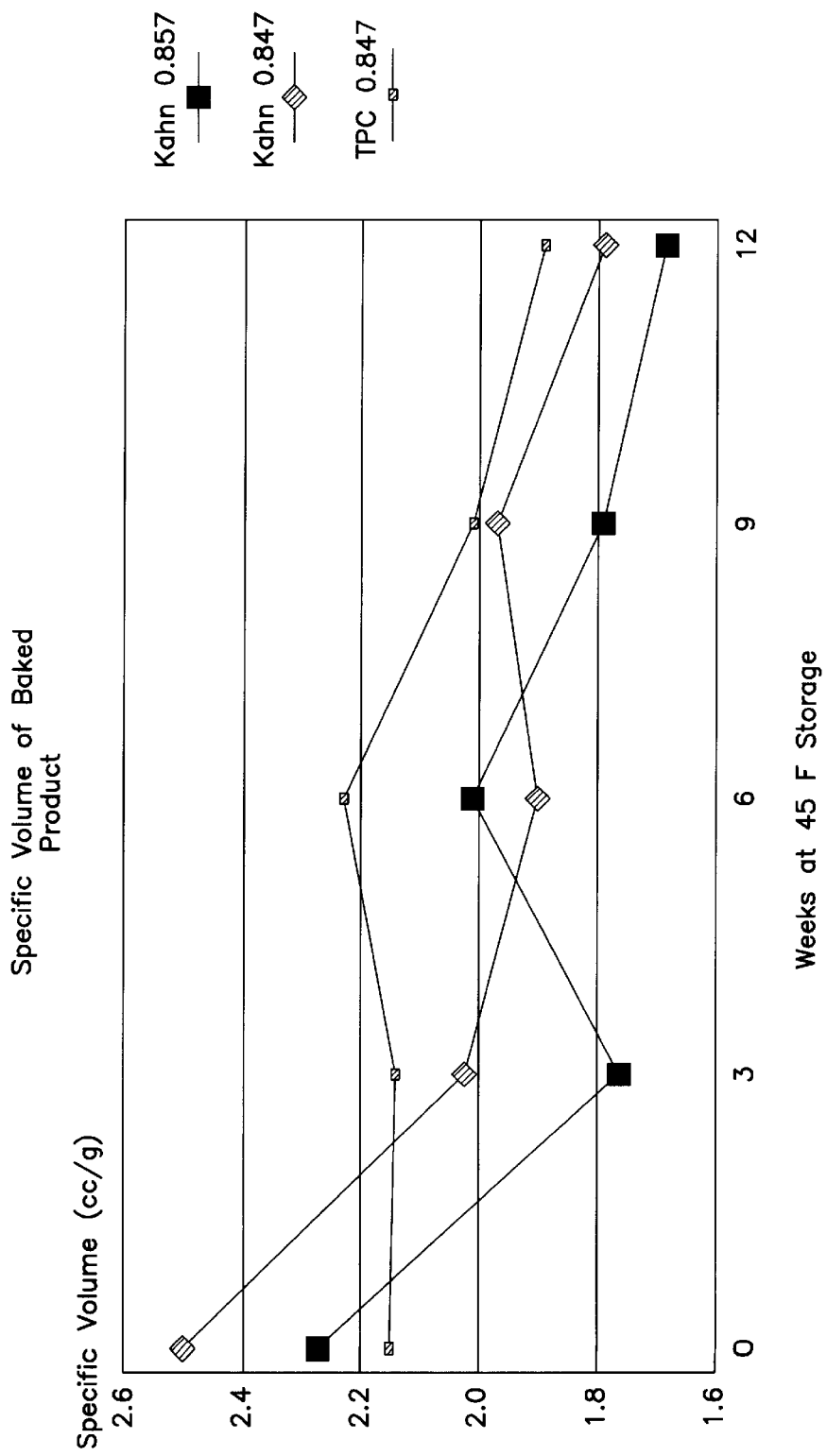
FIG. 3 is graphical comparison of the specific volumes of baked products between two formulations of Kahn, U.S. Pat. No. 4,154,863, and the formulation of the invention.

The specific volume of the products resulting from the batter of the invention dropped about 12% over the storage period, with the drop happening after 9 weeks of storage. The product resulting from the batter of the invention maintained its specific volume longer than the Kahn product. This is seen in the graph given as FIG. 3.

Kahn batter A ($A_w$ 0.857) was initially creamy white and thin, but after 3 weeks of storage at 45 F., started to separate with a brown liquid settling to bottom of tub. By 6 weeks, ⅓ of tub is brown liquid, and by 9 weeks, ½ of tub is brown liquid. Kahn batter B ($A_w$ 0.847) also separated with storage time, but not as severely as the former sample.

The batter of the invention started out a creamy color and thick, and turned slightly darker yellow after 6 weeks of storage. The batter of the invention did not separate at any time throughout the 12 weeks of storage and maintained its thick consistency.

The Kahn batters (A and B) baked up into flat, mushroom-like cupcakes with a shiny dark surface on top. The Kahn batters (A and B) often produced "blow outs", where some batter was expelled out from under the surface of the product during baking. (This is most likely due to premature crust setting and the resulting steam buildup inside the product as the interior continues to bake.) The baked products resulting from the Kahn batters A and B had fine interior grain, sweet taste, and tender texture but became very dense and gummy by week 9. These baked products had a very deep brown crust color by 6 weeks of storage.

Figure 4:
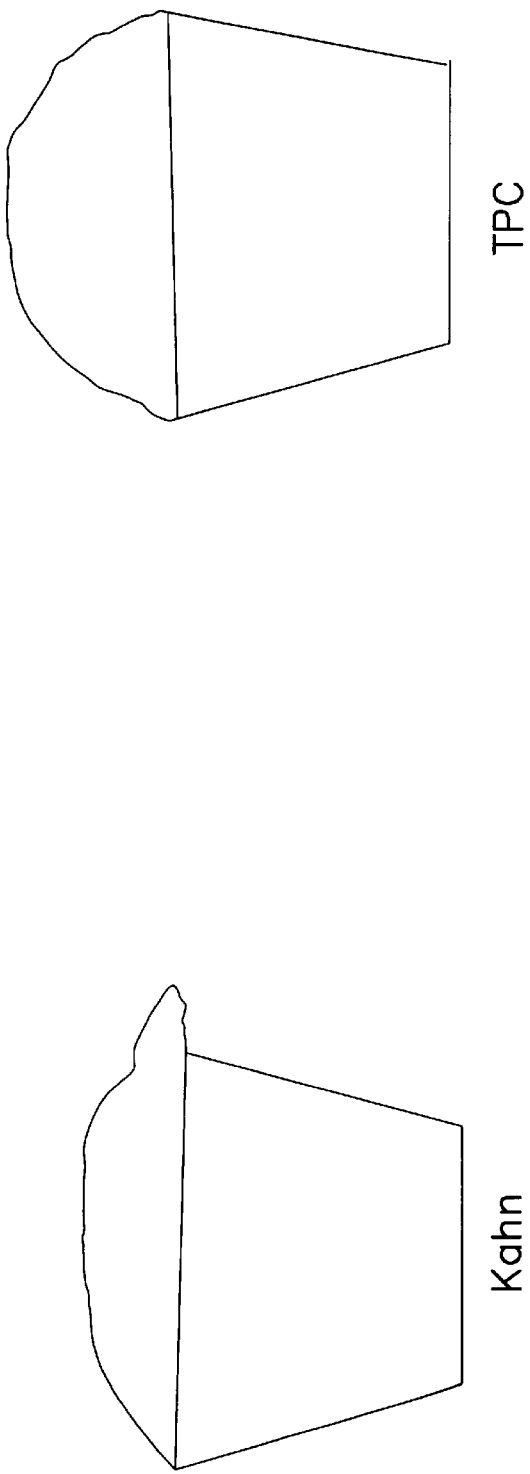
FIG. 4 is a graphical representation of the typical profiles of the baked goods resulting from the batters of Kahn, U.S. Pat. No. 4,154,863 and the formulations of the invention.

The batters of the invention baked up tall with rounded domed tops. Crusts were light golden brown, with some surface cracking. These baked products had a slightly coarse interior grain, typical of muffins. The texture becomes more dense after 9 weeks of storage, but less dense than the Kahn products at the same time period. The baked product resulting from batters of the invention exhibited a golden brown crust until week 12, when it appeared a darker brown. However, the crust color of the baked products using batters of the invention was lighter than the Kahn product at week 12. FIG. 4 shows the differences in average baked height and shape.

The batter of the invention is superior to the Kahn batter when stored at 45° F. for up to 12 weeks based on bake height, specific volume, batter appearance and baked appearance. The batter of the invention maintains its original attributes longer than the Kahn batter under refrigerated storage conditions. The products of the invention, in general, started to drop in baked height and specific volume after 9 weeks of storage, while the Kahn products started to drop after 3 weeks of storage. Both the Kahn and the batters of the invention were microbiologically stable under refrigerated storage after 12 weeks.

Kahn A and B have vastly different yield stress properties than the batter of the invention. The yield stress of the Kahn batter of Example 7 was measured to be about 11 Pascals (Pa) compared to a batter of the present invention which had a yield stress of about 232 Pa. The yield stress of a conventional batter, made from scratch, is less than 100 Pa, and is closer to about 50 Pa. The yield stress of a conventional dough, such as a cookie dough, is quite high, around 6500 Pa.

The batters in Kahn are described as being pourable or flowable right out of the freezer (see column 3, lines 7–8). Also, these batters have a higher penetrometer reading than conventional batters when frozen (see column 20 lines 31–33), which indicates that all the batters described in Kahn are thinner and less viscous than conventional batters.

The batters of the invention, however, are thicker and more viscous than conventional batters, but not as viscous as doughs. It was unexpected that the batters of the invention with a yield stress much higher than a conventional batter or the Kahn batter could provide specific volumes and bake heights comparable to a made-from-scratch batter, even after prolonged refrigerated storage.

Typically, specific volume and bake height in cake or muffin products are physically affected by the yield stress of the batter in an inversely proportional way. If the batter is very viscous, the baked product will have a low specific volume and bake height, while if the batter is less viscous, the baked product will have a higher specific volume and bake height. In the invention, the batter is more viscous than a conventional muffin batter, and yet provides similar specific volumes and bake heights in products resulting from baking the batter. Even more surprising is the observation that Kahn A and B, which are less viscous than a conventional batter and contains more water than the batter of the invention did not bake up to the specific volumes and bake heights of the products of the invention.

Without intending to be bound by theory, it is believed that this unusual result is obtained by the low water activity of the batter, the ratio of the oil and water in the batter, and the yield stress of the batter of the invention. The ratio of sugar to water in the batter achieves the low water activity to ensure microbial stability. It is believed that the high oil-to-water ratio acts to sequester some of the ingredients from reacting with water during mixing, but as the temperature of the batter increases (and yield stress decreases) during baking, these ingredients become available to react and provide the desired finished product attributes similar to a made-from-scratch batter product. The relatively high yield stress of the batter would appear to adversely affect the specific volume and bake height, but it is believed that the high oil/water ratio provides the necessary plasticity during baking to result in the high specific volumes and bake heights.

The above specification, examples and data provide a complete description of the invention. Since many embodiments of the invention are possible without departing from the spirit and scope of the invention, the invention resides solely in the claims hereinafter appended.

I claim:

1. A refrigeration stable, spoonable batter for use in providing a baked composition, said batter comprising:
   (a) a structure providing amount of flour;
   (b) a source of sugar in an amount of about 20 to 40 wt-% and effective to provide an $A_w$ of less than about 0.92;
   (c) an effective amount of leavening system to provide a finished product a desired property;
   (d) an amount of shortening effective to enhance the organoleptic properties of the batter; and
   (e) a balance of water, wherein the ratio of total sugar to water is 1–2.2:1; and
   wherein said batter is shelf stable under refrigerated conditions and said batter has a yield stress of from about 100 to 1500 Pa.

2. The batter of claim 1 having an $A_w$ of about 0.81 to about 0.92.

3. The batter of claim 1 having an $A_w$ of about 0.85.

4. The batter of claim 1 wherein the sugar is selected from the group consisting of sucrose, high fructose corn syrup, maltose, sorbitol, maltodextrin, lactose, and mixtures thereof.

5. The batter of claim 1 wherein the sugar is selected from the group consisting of sucrose, maltodextrin, high fructose corn syrup, and mixtures thereof.

6. The batter of claim 1 wherein the leavening system is heat activated.

7. The batter of claim 1 wherein the leavening system comprises sodium aluminum phosphate and baking soda.

8. The batter of claim 1 wherein the sugar comprises a mixture of high fructose corn syrup and sucrose.

9. The batter of claim 8 wherein the ratio of high fructose corn syrup to sucrose is about 0.14 to 0.48.

10. The batter of claim 8 wherein the ratio of high fructose corn syrup to water is about 0.28 to 0.60.

11. The batter of claim 1 wherein the ratio of sucrose to water is about 1.26 to 2.00.

12. The batter of claim 1 comprising:
    (a) about 20 to 50 wt-% flour;
    (b) about 10 to 30 wt-% water;
    (c) about 20 to 40 wt-% total sugars;
    (d) about 5 to 20 wt-% shortening or oil; and
    (e) about 0.4 to 1 wt-% leavening.

13. The batter of claim 1 having a yield stress value of about 500 to 1500 Pascals under refrigeration conditions.

14. The batter of claim 1 having a yield stress value of about 700 to 1100 Pascals under refrigeration conditions.

15. The batter of claim 1 having a baked height to raw height ratio greater than about 1.

16. The batter of claim 1 comprising:
    (a) about 20 to 30 wt-% flour;
    (b) about 20 to 30 wt-% sucrose; and
    (c) about 15 to 25 wt-% water.

17. The batter of claim 1 comprising:
    (a) about 25.6 wt-% flour;
    (b) about 20.4 wt-% sucrose;
    (c) about 9.7 wt-% high fructose corn syrup;
    (d) about 16.3 wt-% water; and
    (e) about 12.2 wt-% oil.

18. The batter of claim 16 further comprising about 5.0 wt-% glycerol.

19. The batter of claim 16 further comprising about 10.2 wt-% maltodextrin.

20. The batter of claim 1 wherein sucrose comprises greater than about 50 to 95% of the total sugar.

21. The batter of claim 1 wherein sucrose comprises greater than about 70% of the total sugar.

22. A baked food item prepared by baking the batter of claim 1.

* * * * *